(12) United States Patent
Oshima

(10) Patent No.: US 12,306,564 B2
(45) Date of Patent: May 20, 2025

(54) POWER SOURCE DEVICE AND IMAGE FORMING APPARATUS

(71) Applicant: CANON KABUSHIKI KAISHA, Tokyo (JP)

(72) Inventor: Mitsunori Oshima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/489,318

(22) Filed: Oct. 18, 2023

(65) Prior Publication Data

US 2024/0176272 A1 May 30, 2024

(30) Foreign Application Priority Data

Nov. 24, 2022 (JP) ................. 2022-187723

(51) Int. Cl.
*G03G 15/00* (2006.01)
*G03G 15/20* (2006.01)
*H02M 1/36* (2007.01)
*H02M 7/217* (2006.01)

(52) U.S. Cl.
CPC ....... *G03G 15/5004* (2013.01); *G03G 15/205* (2013.01); *H02M 1/36* (2013.01); *H02M 7/217* (2013.01)

(58) Field of Classification Search
CPC ... G03G 15/205; G03G 15/5004; H02M 1/36; H02M 7/217
USPC .......................................................... 399/88
See application file for complete search history.

(56) References Cited

U.S. PATENT DOCUMENTS

| 8,008,892 | B2 * | 8/2011 | Kikuchi | G03G 15/80 |
| | | | | 320/132 |
| 9,048,737 | B2 * | 6/2015 | Jeong | G03G 15/80 |
| 10,411,606 | B2 | 9/2019 | Oshima | |
| 10,720,828 | B2 * | 7/2020 | Kojima | H02M 7/06 |
| 2022/0368237 | A1 | 11/2022 | Oshima | |

FOREIGN PATENT DOCUMENTS

| CN | 103127453 | * | 7/2013 |
| JP | 10-164853 A | | 6/1998 |
| JP | 2004004712 | * | 1/2004 |

(Continued)

OTHER PUBLICATIONS

U.S. Appl. No. 18/224,123, filed Jul. 20, 2023 by Mitsunori Oshima.

*Primary Examiner* — Hoan H Tran
(74) *Attorney, Agent, or Firm* — VENABLE LLP

(57) ABSTRACT

A power source device includes a rectifying portion, a switching portion to apply a voltage to a load, fully rectified by the rectifying portion, a detecting portion to detect a zero-cross point of the AC voltage, and a filter including a capacitor provided between the rectifying portion and the switching portion. A controller controls the switching portion so as to execute a discharge operation to discharge the capacitor before starting a switching operation from a stop state of the switching operation and so as to start the switching operation when the zero-cross point is detected by the detecting portion. An electric power outputted from the switching portion during the discharge operation is smaller than an electric power outputted from the switching portion during the switching operation.

19 Claims, 7 Drawing Sheets

(56) References Cited

FOREIGN PATENT DOCUMENTS

| | | |
|---|---|---|
| JP | 2010-178521 A | 8/2010 |
| JP | 2012-85523 A | 4/2012 |
| JP | 2022-39229 A | 3/2022 |

* cited by examiner

POWER SOURCE DEVICE AND IMAGE FORMING APPARATUS

FIELD OF THE INVENTION AND RELATED ART

The present invention relates to a power source device and an image forming apparatus, and in particular, relates to the power source device which is able to reduce noise of a switching power source and the image forming apparatus on which the power source device is mounted.

Conventionally, there is a switching power source which converts AC power to AC power of arbitrary frequency after fully rectified by a diode bridge. In order to reduce noise which is generated by the switching power source, a method that timing to start switching is synchronized with a zero-cross of the AC power source is disclosed in Japanese Laid-Open Patent Application (JP-A) 2012-085523. Further, in order to prevent switching noise from propagating to the AC power source, a filter with electrostatic capacity may be provided between a diode bridge and a switching portion.

However, during a period when a switching operation of the switching power source is stopped, an input voltage to the switching portion is clamped at a maximum voltage of the AC power source by the electrostatic capacity of the filter. Therefore, even when the timing to start switching is synchronized with a zero-cross point, it is necessary to start switching with a high input voltage to the switching power source. Thus, there is a problem that significant noise may be generated when switching is started.

SUMMARY OF THE INVENTION

In response to the above issue, it is an object of the present invention to reduce noise when switching is started, even in a case that a filter with electrostatic capacity is provided between a diode bridge and a switching portion.

According to an aspect of the present invention, a power source device comprising: a rectifying portion configured to fully rectify an AC voltage, a switching portion including a switching element and configured to apply a voltage to a load, fully rectified by the rectifying portion, by a switching operation of the switching element, a detecting portion configured to detect a zero-cross point of the AC voltage, a control portion configured to control the switching operation of the switching portion, and a filter portion including a capacitor, provided between the rectifying portion and the switching portion and configured to absorb a switching noise generated in the switching portion, wherein the control portion configured to control the switching portion so as to execute a discharge operation to discharge the capacitor before starting the switching operation from a stop state of the switching operation and so as to start the switching operation when the zero-cross point is detected by the detecting portion, and wherein an electric power outputted from the switching portion during the discharge operation is smaller than an electric power outputted from the switching portion during the switching operation.

Further features of the present invention will become apparent from the following description of exemplary embodiments with reference to the attached drawings.

Figure 2:
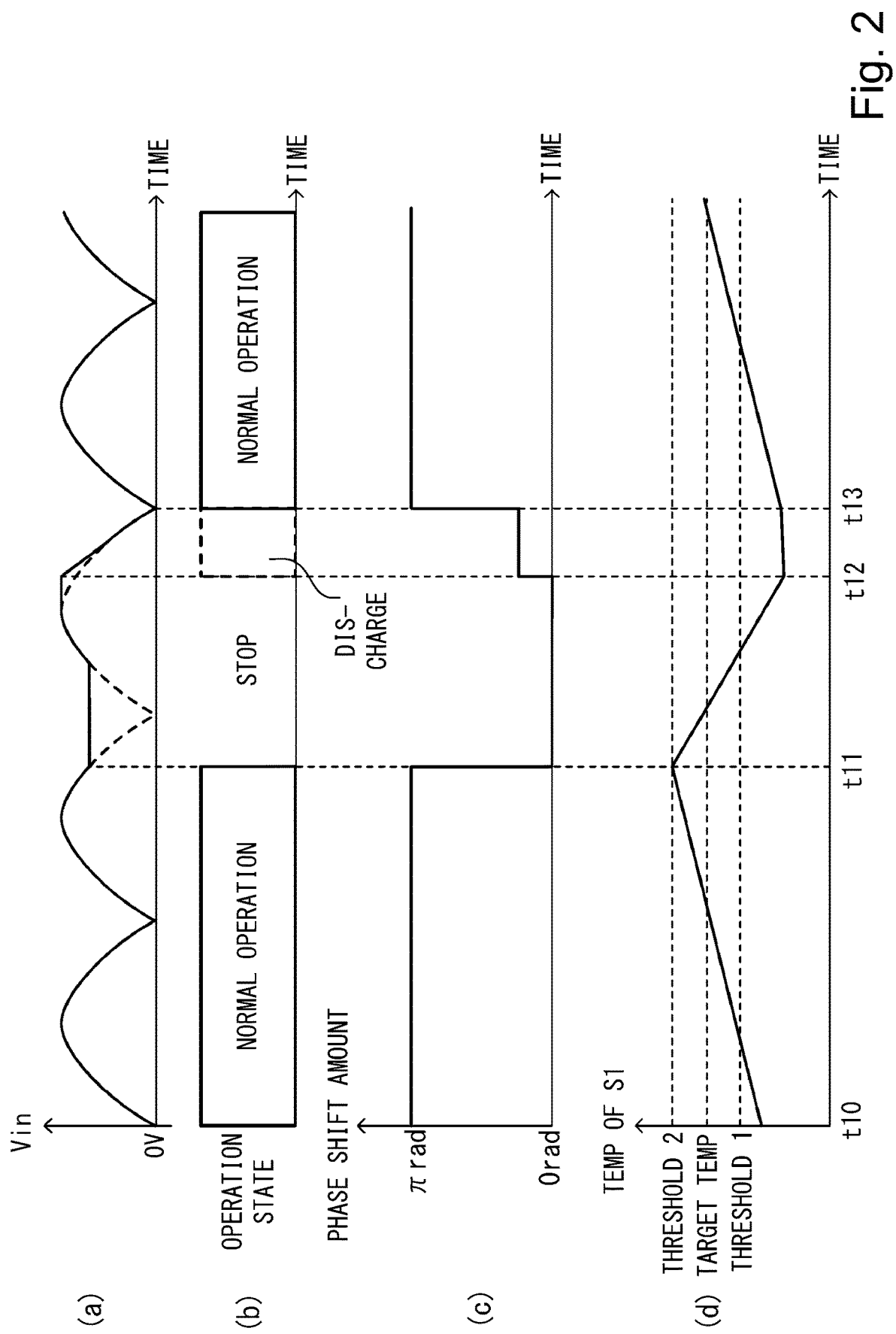

Part (a), part (b), part (c) and part (d) of FIG. 2 are schematic diagrams of an operating waveform of the switching power source according to the first embodiment.

Figure 3:
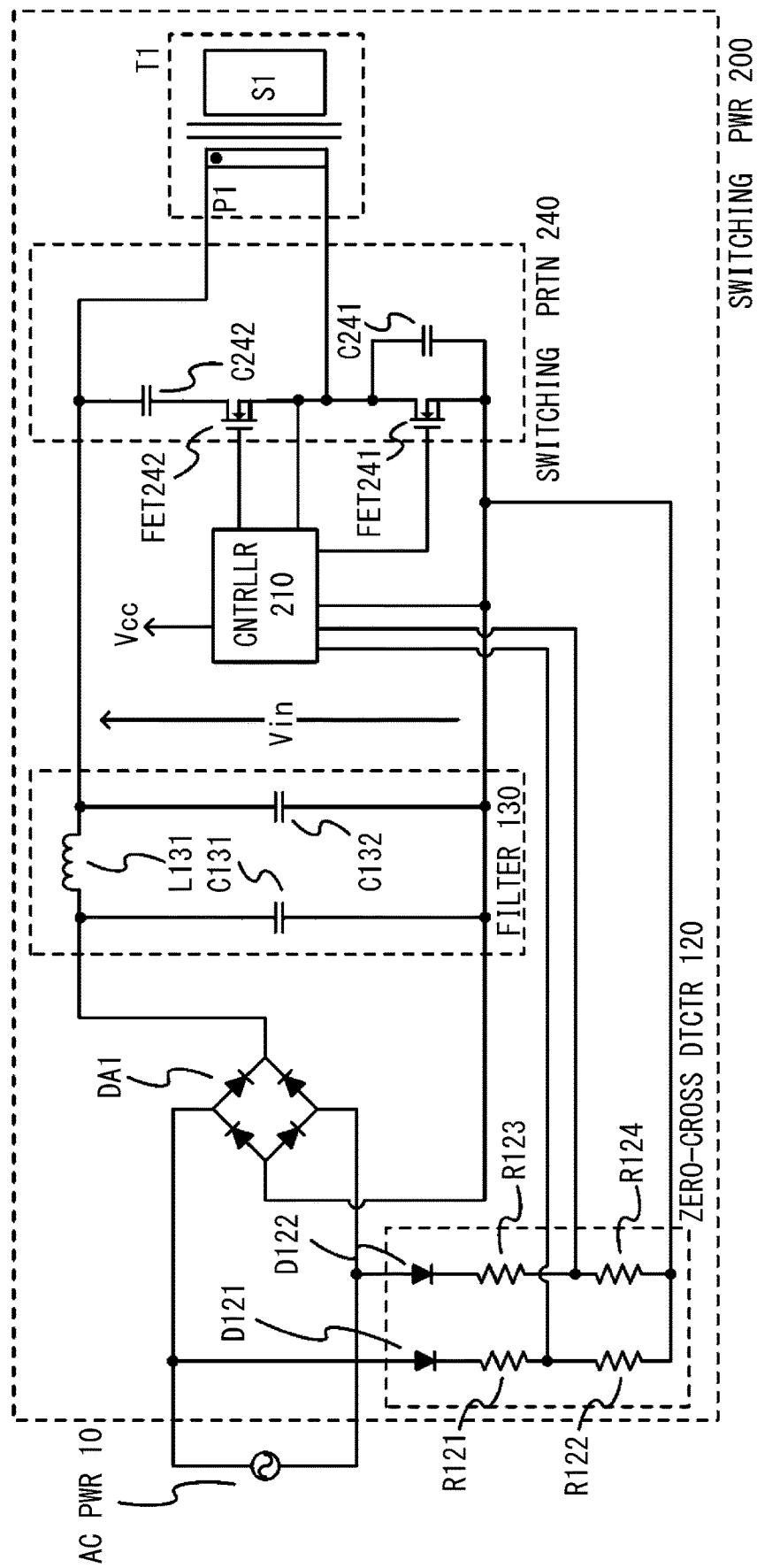

FIG. 3 is a schematic diagram of a switching power source according to a second embodiment.

Figure 4:
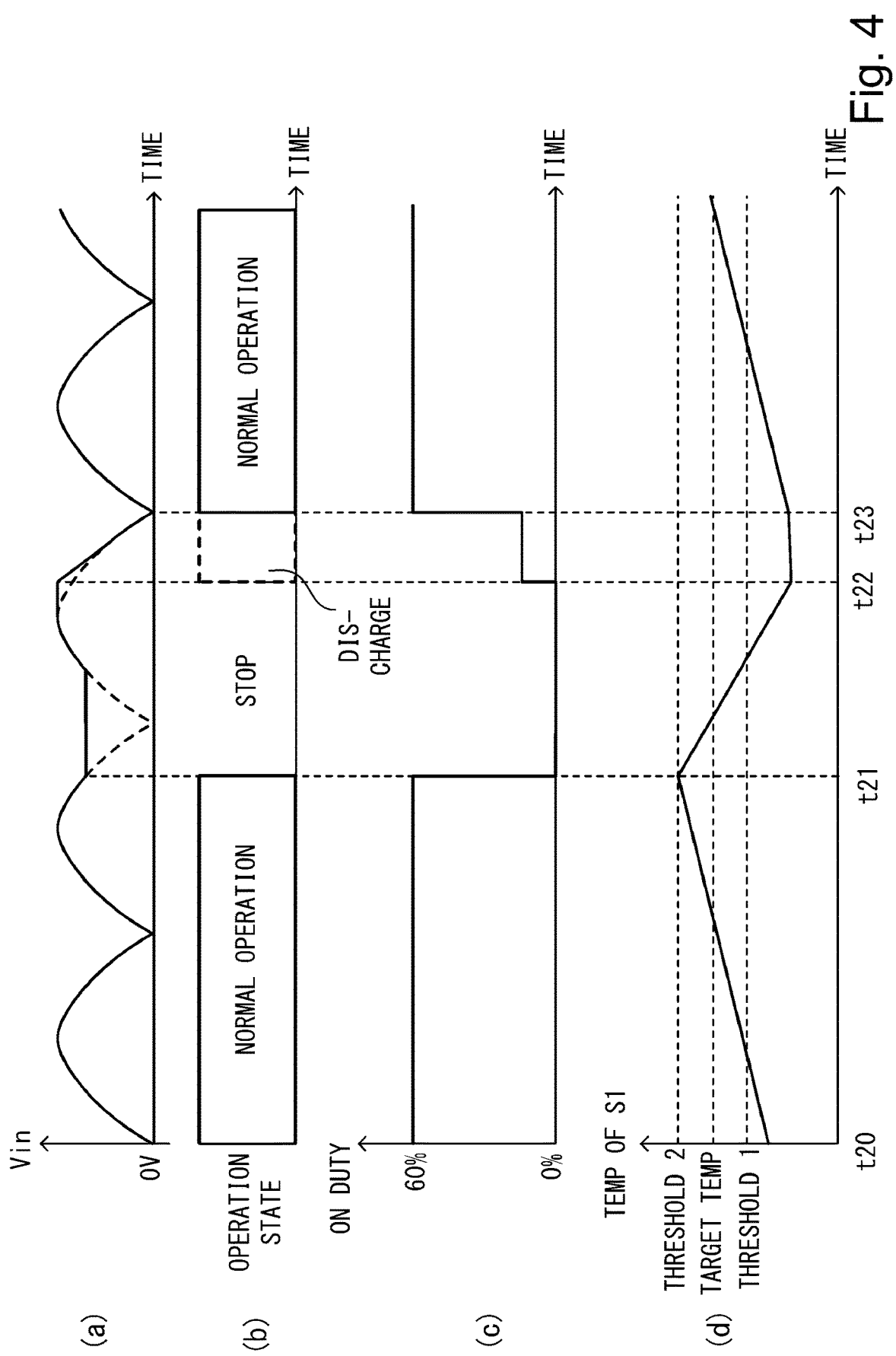

Part (a), part (b), part (c) and part (d) of FIG. 4 are schematic diagrams of an operating waveform of the switching power source according to the second embodiment.

Figure 5:
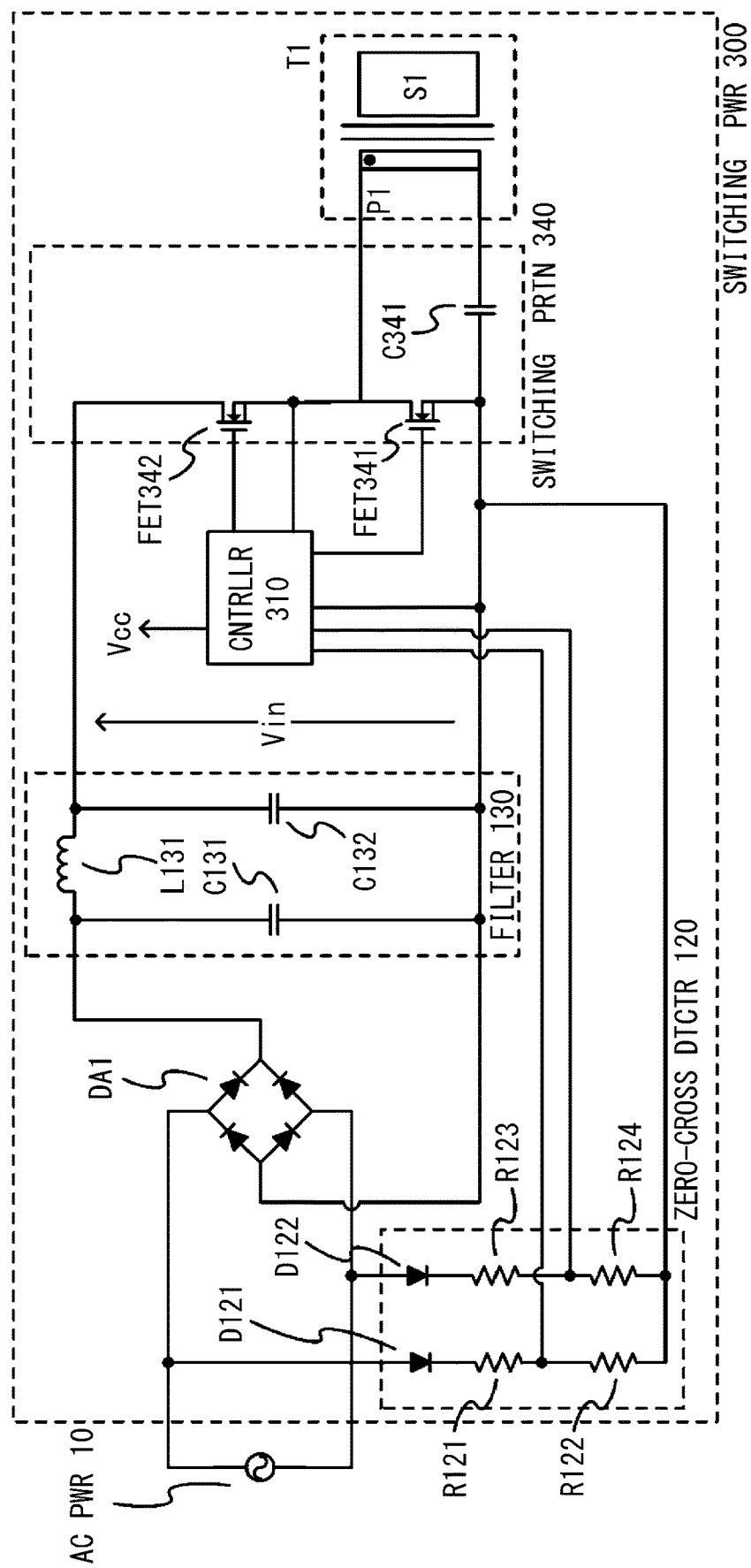

FIG. 5 is a schematic diagram of a switching power source according to a third embodiment.

Figure 6:
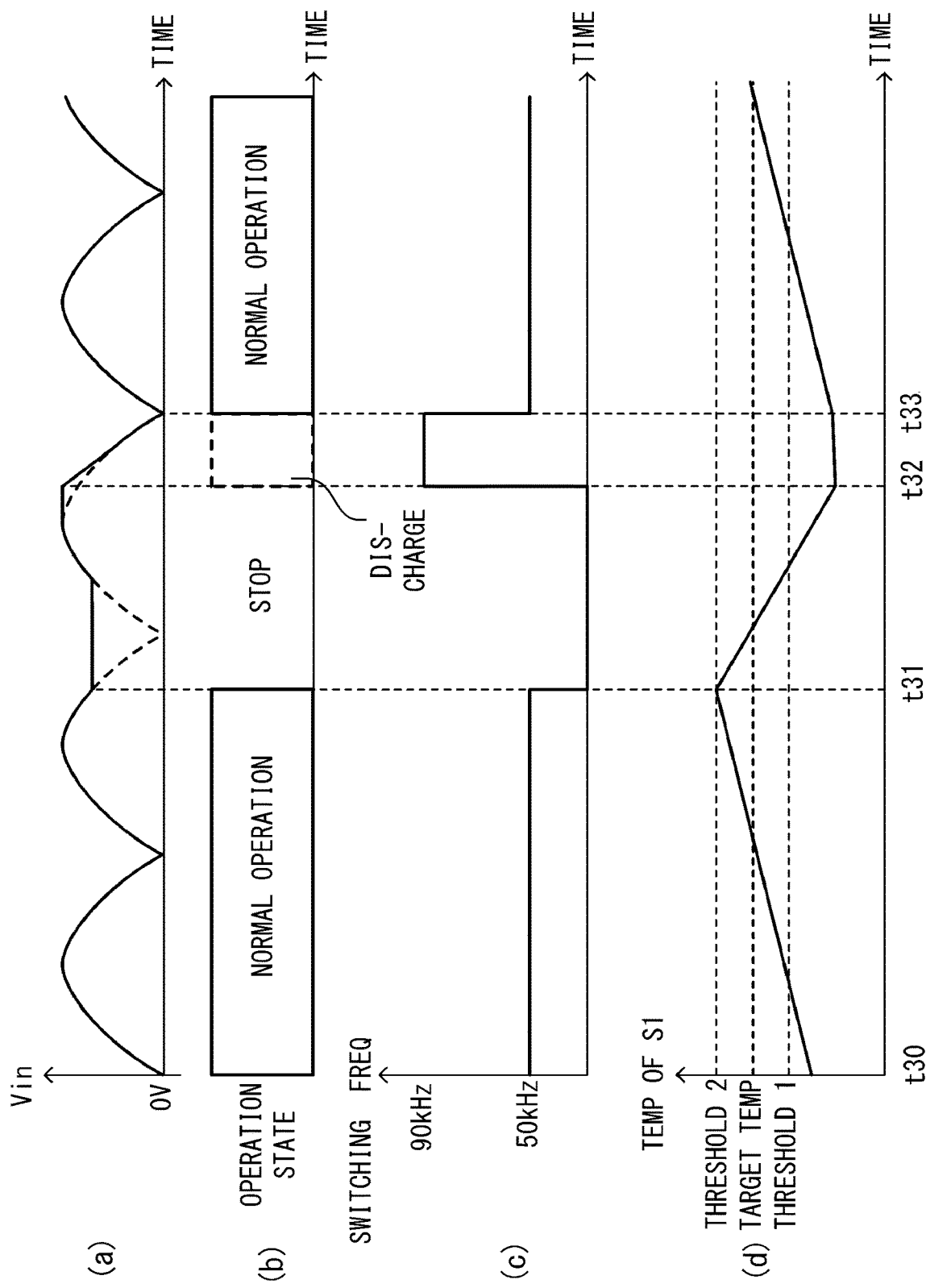

Part (a), part (b), part (c) and part (d) of FIG. 6 are schematic diagrams of an operating waveform of the switching power source according to the third embodiment.

Figure 7:
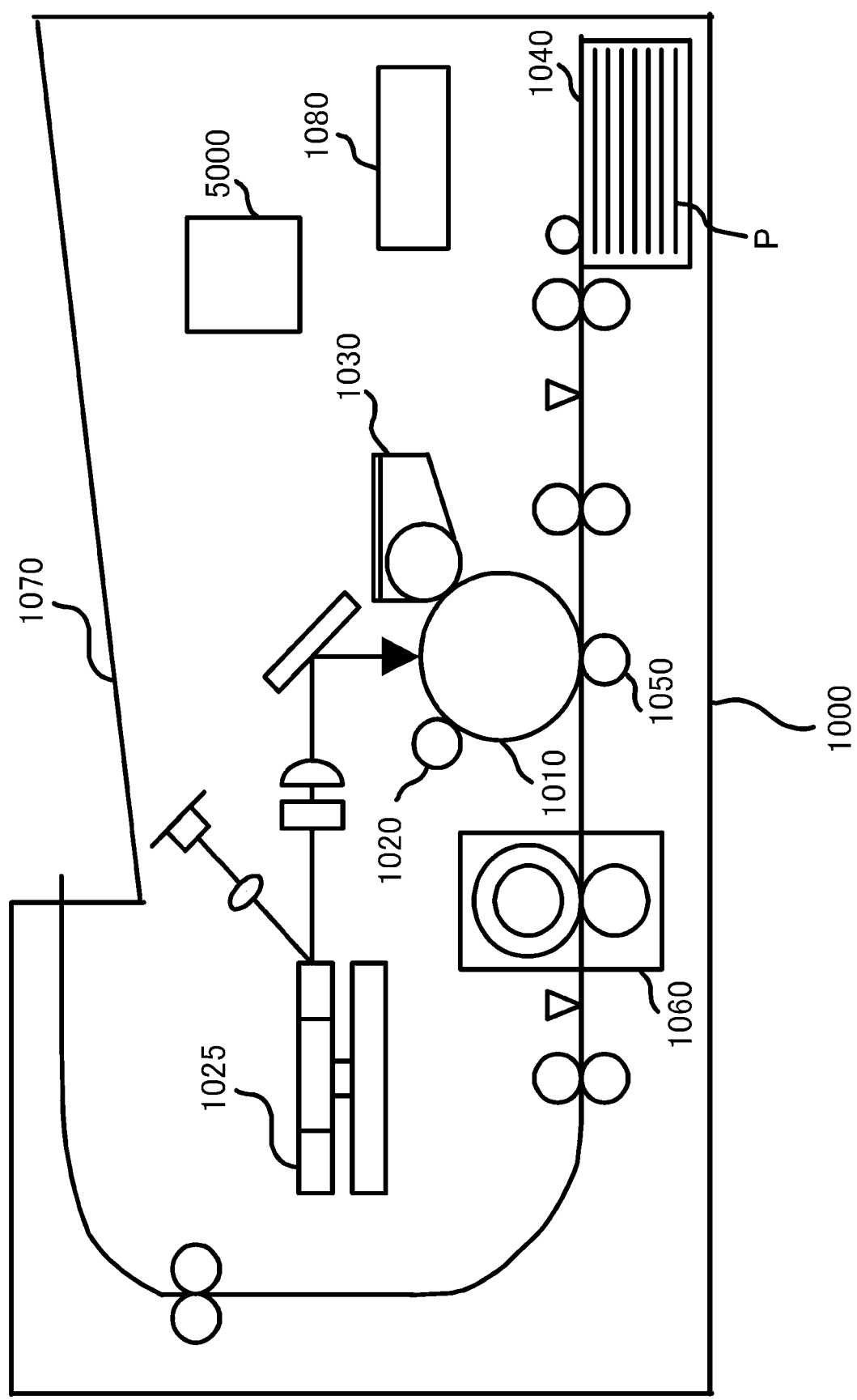

FIG. 7 is a view showing an image forming apparatus according to a fourth embodiment.

DESCRIPTION OF THE EMBODIMENTS

In the following, embodiments of the present invention will be specifically described with reference to the figures according to the embodiments.

First Embodiment

A switching power source 100 according to the first embodiment is an inverter which supplies AC power of arbitrary frequency to an insulated heating member, and is characterized by performing a discharge operation whose output electric power is less than a normal operation before switching is started. A circuit configuration of the switching power source 100 will be described below, and then its operation will be described.

[Switching Power Source]

Figure 1:
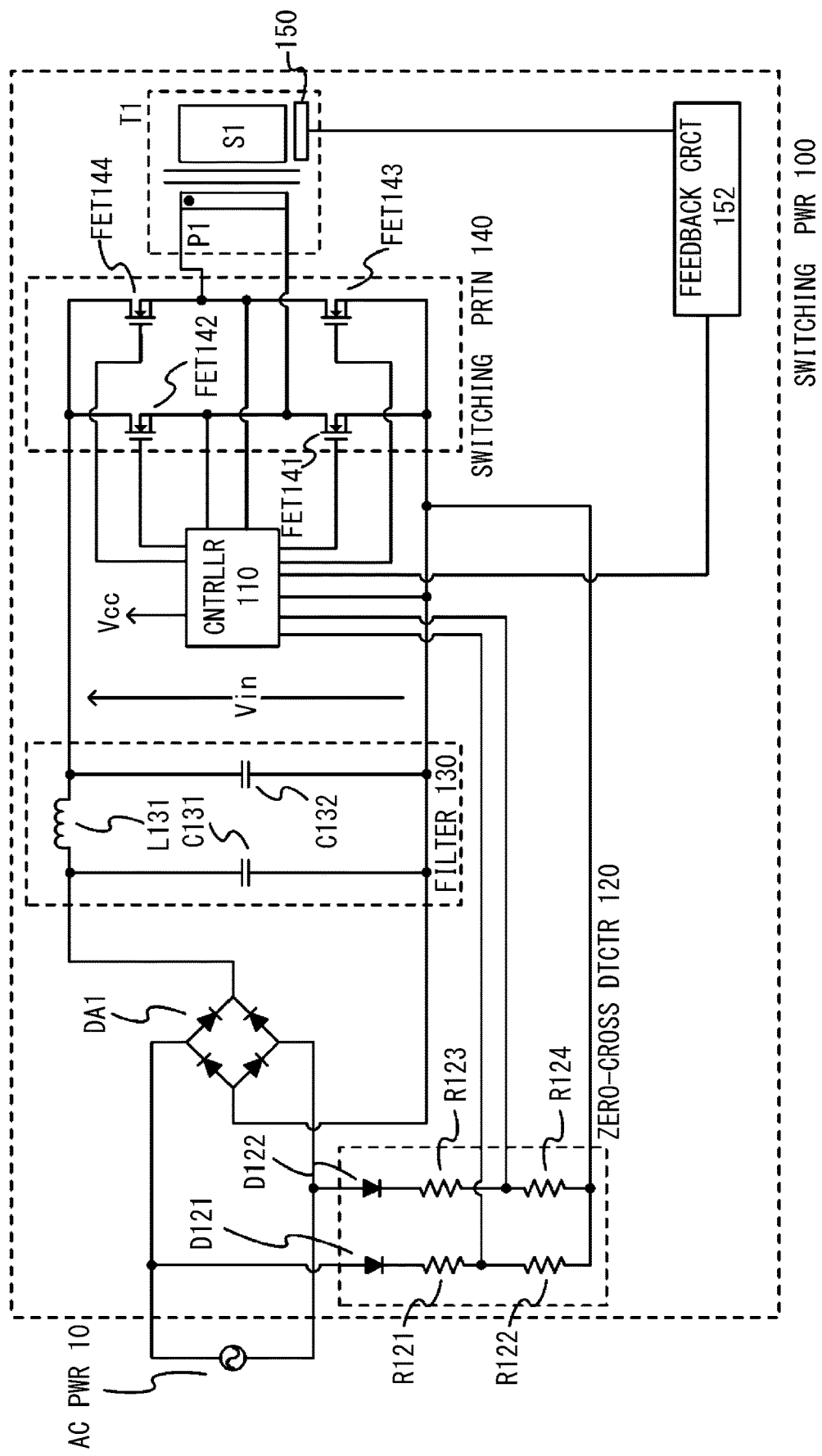
FIG. 1 is a schematic diagram of a switching power source according to a first embodiment of the present invention.

The circuit configuration of the switching power source 100 which is a power source will be described by using FIG. 1. The switching power source 100 includes a diode bridge DA1 which is a rectifying portion which fully rectifies an AC voltage of an AC power source 10, a control portion 110, a zero-cross detection circuit 120 which is a detection portion, a filter 130, a switching portion 140 and an inductive load T1 (load). The switching power source 100 supplies electric power to a heating member S1 on a secondary side which is a part of the inductive load T1 and isolated from the AC power source 10, and the control portion 110 controls the switching portion 140 so that a temperature of the heating member S1 remains constant. The control portion 110 is operated by a power source voltage Vcc.

Incidentally, the switching power source 100 is used as an ACAC inverter in the first embodiment, however, it may be used as a switching power source which is other than the ACAC inverter. As an example, it may be used as a power factor compensation (PFC) circuit by replacing the load with a capacitor in an input portion of another switching power source. Further, for example, the load may include a transformer with a primary winding and secondary winding and may be an ACDC inverter. Further, the switching power source 100 includes a temperature detecting portion 150, such as a thermistor which detects a temperature of the heating member S1. Furthermore, the switching power source 100 includes a feedback circuit 152 which feeds back temperature information (detected temperature) of the heating member S1 which is detected by the detecting portion 150 to the control portion 110.

The control portion 110 is a circuit for controlling the switching portion 140. The control portion 110 outputs a signal which controls a switching operation of the switching portion 140 based on an output signal of the zero-cross detection circuit 120 and an output signal corresponding to the temperature information of the heating member S1 from the feedback circuit 152.

The zero-cross detection circuit 120 is a circuit for detecting a zero-cross point, which is a timing when an instantaneous value of voltage of the AC power source 10 becomes 0V. That is, the zero-crossing detection circuit 120 detects the zero-crossing point, which is a point at which the AC voltage of the AC power source 10 switches from a negative polarity to a positive polarity or from the positive polarity to the negative polarity. The zero-cross detection circuit 120 is configured of diodes D121 and D122 and resistors R121, R122, R123 and R124.

During a period of high potential of a phase on a side of the AC power source 10 to which the diode D121 is connected, an absolute value of an instantaneous value of voltage of the AC power source 10, which is divided by the resistor R121 and the resistor R122, is output to the control portion 110. On the other hand, during a period of high potential of a phase on a side of the AC power source 10 to which the diode D122 is connected, an absolute value of an instantaneous value of voltage of the AC power source 10, which is divided by the resistor R123 and the resistor R124, is output to the control portion 110. The control portion 110 is capable of detecting the zero-cross point of the AC power source 10 by detecting the output voltage of the zero-cross detection circuit 120. Incidentally, the zero-cross detection circuit 120 is configured to detect the zero-cross point by detecting the instantaneous value of the voltage of the AC power source 10 in the first embodiment, however, a circuit which outputs a digital signal whose logic switches at each zero-cross point, etc. may also be used.

The filter 130, which is a filter portion, is a $\pi$-type EMI (Electro Magnetic Interference) filter which is configured of capacitors C131 and C132 and an inductor L131. The filter 130 is a circuit which prevents switching noise in the switching portion 140 from propagating to the AC power source 10. By adjusting inductance of the inductor L131 and the electrostatic capacity of the capacitors C131 and C132 according to a switching frequency of the switching portion 140, the filter 130 absorbs switching noise which is generated in the switching portion 140. It is possible to prevent the switching noise which is generated in the switching power source 100 from propagating to the AC power source 10 by the filter 130, and reduce its effect on other electronic devices which are connected to the AC power source 10. When the output voltage of the filter 130 is defined as voltage Vin, time transition of the voltage Vin during an operation of the switching power source 100 will be described by using part (a), part (b), part (c) and part (d) of FIG. 2. Incidentally, in the first embodiment 1, the $\pi$-type filter which is configured of the capacitors and the inductor is applied to the filter 130, however, other type of EMI filter such as an LC filter and a bypass capacitor, for example, may be applied.

The switching portion 140 is a full-bridge type switching circuit which is configured of four switching elements, namely, field effect transistors (hereinafter referred to as FET) 141, 142, 143 and 144. Source terminals of the FET141 and the FET143 which are low-side FETs are connected to a low potential side of output terminals of the diode bridge DA1. On the other hand, drain terminals of the FET142 and the FET144 which are high-side FETs are connected to a high potential side of output terminals of the diode bridge DA1. Further, a drain terminal of the FET141 is connected to a source terminal of the FET142, and a drain terminal of the FET143 is connected to a source terminal of the FET144. An inductor on a primary side of the inductive load T1 (hereinafter referred to as a primary inductor) P1 is connected between the drain terminal of the FET141 and the drain terminal of the FET143.

The FET141 and the FET142 are controlled so as to turn on and off complementarily with dead times therebetween and so that on-time of both of the FETs is same as off-time in which the dead times are excluded. Incidentally, the dead time is a condition that both of the two FETs are off. Similarly, the FET143 and the FET144 are controlled so as to turn on and off complementarily with dead times therebetween and so that on-time of both of the FETs is same as off-time in which the dead times are excluded. Further, on-time and off-time of the FET141, the FET142, the FET143 and the FET144 are same.

The switching portion 140 controls an output electric power by a phase shift control, which shifts phases of switching on and off of the FET141 and the FET142 and phases of switching on and off of the FET143 and the FET144. The output electric power is, for example, 1000 W. When a phase shift amount in the phase shift control is 0 rad (radian), the FET143 is switched on and off in conjunction with the FET141, and the FET144 is switched on and off in conjunction with FET 142.

As the phase shift amount increases, timings of switching on and off of the FET141 and the FET143 are deviated each other, and similarly timings of switching on and off of the FET142 and the FET144 are deviated each other. When the phase shift amount reaches $\pi$ rad, the timings of switching on and off of the FET141 and the FET143 are reversed, and similarly, the timings of switching on and off of the FET142 and the FET144 are reversed.

Further from that state, when the phase shift amount becomes $\pi$ rad, the timings of switching on and off of the FET141 and the FET144 are matched each other, and similarly, the timings of switching on and off of the FET142 and the FET143 are matched each other. Incidentally, a reason why a unit of the phase shift amount is not a second but an angle (rad) is that a control frequency of the switching portion 140 is variable. When deviation amounts of switching on and off between the FET141 and the FET143 and between the FET142 and the FET144 are described in time, those are equal to values in which control cycles of the FET141, the FET142, the FET143 and the FET144 are multiplied by one part of $2\pi$ of the phase shift amount (rad).

Electric power is supplied to the inductive load T1 during a period when the FET144 is switched on together with the FET141 and during a period when the FET143 is switched on together with the FET142. Therefore, in a case that the phase shift amount is 0 rad in which the FET141 and the FET144, and the FET142 and the FET143 are never switched on substantially at the same time, the output power of the switching portion 140 is 0 W. The greater the phase shift amount, the longer the period when the FET141 and the FET144, and the FET142 and the FET143 are switched on at the same time, so the output power of the switching power source 100 increases, and the output electric power is maximum when the phase shift amount is $\pi$ rad. Details of a control method of the phase shift amount will be described by using part (a), part (b), part (c) and part (d) of FIG. 2.

Incidentally, the FET141, the FET142, the FET 143 and the FET 144 are all N-channel (Nch) FETs. Further, in the switching power source 100 according to the first embodiment, FETs are used as switching elements. However, an IGBT (Insulated Gate Bipolar Transistor) may be used instead and, for example, may be connected to a reverse diode in parallel. Unlike an FET, an IGBT does not include a parasitic diode, so it is necessary to connect a reverse diode externally. An anode terminal of the diode is connected to an emitter terminal of the IGBT, and a collector terminal of the diode is connected to a collector terminal of the IGBT.

The inductive load T1 is configured of a primary inductor P1 on a primary side and a heating member S1 on a secondary side. The primary inductor P1 and the heating member S1 are magnetically coupled, and electric power is supplied to the heating member S1 from the primary inductor P1 according to the switching operation of the switching portion 140. When electric power is supplied from the primary inductor P1, an electric current flows in the heating member S1, and the heating member S1 heats up due to Joule heat which is generated by an electrical resistance of the heating member S1 itself. Incidentally, in the first embodiment, the inductive load T1 in which the primary side and the secondary side are insulated is used as an example, however, depending on a safety design of a device in which the switching power source is applied, a configuration which corresponds to reinforced insulation or double insulation under safety standards between the primary inductor P1 and the heating member S1 is not required.

By the way, in the first embodiment, the capacitor C131 and the capacitor C132 apply film capacitors with low electrostatic capacity and high ripple current rating, this is because it is not necessary to store large energy between the diode bridge DA1 and the switching portion 140. A general switching power source such as an ACDC converter usually performs switching after rectifying and smoothing an AC power source while a smoothing capacitor which has high electrostatic capacity and low ripple current rating such as an aluminum electrolytic capacitor is provided on an output terminal side of the diode bridge. Because this is to keep the output voltage of the switching power source constant by energy which is stored in the smoothing capacitor, even in an event of instantaneous voltage fluctuation or power outage in the AC power source. However, in a case that an output electric power of the switching power source is large (for example, 1000 W or more), the ripple current which flows through the smoothing capacitor is also large, so when a capacitor whose ripple current rating is low is used as a smoothing capacitor, it is necessary to connect a lot of capacitors in parallel. In general, since a capacitor which has high electrostatic capacity and low ripple current rating such as an aluminum electrolytic capacitor is large in size, using capacitors whose ripple current rating is low in the switching power source whose output electric power is large leads to increasing the size of the switching power source. On the other hand, in the first embodiment, an object of control of the switching power source 100 is the heating member S1, so even when the AC power source 10 is temporarily unable to supply electric power to the heating member S1 due to instantaneous voltage fluctuation or power outage of the AC power source 10, the temperature of the heating member S1 does not change sharply. Therefore, it is not necessary to store large amounts of energy to account for instantaneous voltage fluctuation or power outage, and it is only necessary for an electrostatic capacity in the filter 130 to be sufficient to absorb switching noise. Thus, the capacitor C131 and the capacitor C132 are downsized by applying the film capacitors with low electrostatic capacity and high ripple current rating.

[Control of Switching Power Source]

A method of controlling the switching power source 100 will be described by using part (a), part (b), part (c) and part (d) of FIG. 2. Part (a) of FIG. 2 shows the voltage Vin while the switching power source 100 is operating. Part (b) of FIG. 2 shows operating states of the switching portion 140 (normal operation, stop, discharge). Part (c) of FIG. 2 shows the phase shift amounts of the FET141 and the FET142, and the FET143 and the FET144, and the phase shift amounts (rad) are shown in a vertical axis. Part (d) of FIG. 2 shows the temperature of the heating member S1, and a threshold value 1 which is a first threshold value, a target temperature, and a threshold value 2 which is a second threshold value which is higher than the first threshold value are shown by dashed lines. In all of them, horizontal axes indicate time. Each of t10, t11, t12 and t13 in the horizontal axes indicates timing. Incidentally, normal operation is to control the heating member S1 to reach the target temperature.

The control portion 110 controls the operating state and the phase shift amount of the switching portion 140 so that the temperature of the heating member S1 remains around the target temperature. The voltage Vin, which is the input voltage of the switching portion 140, and the temperature of the heating member S1 change depending on the operating state of the switching portion 140 and the phase shift amount.

When the temperature of the heating member S1 becomes lower than the threshold value 1, the control portion 110 operates the switching portion 140 in discharge operation (timing t12) and then in the normal operation (timing t13). Further, when the temperature of the heating member S1 becomes higher than the threshold value 2, the control portion 110 stops the switching portion 140 (timing t11), that is, the switching operation is stopped. Here, the target temperature is higher than the threshold value 1 and lower than the threshold value 2 (the threshold value 1<the target temperature<the threshold value 2).

During periods when the switching portion 140 is in the normal operation (from t10 to t11, from t13), the temperature of the heating member S1 continues to increase, and during a period when the switching portion 140 is stopped (from t11 to t12), the temperature of the heating member S1 continues to decrease. In part (a) of FIG. 2, a dashed line shows the voltage waveform in which the AC power source 10 is fully rectified, and a solid line shows the voltage Vin which is the input voltage of the switching portion 140. As the filter 130 was described above, the electrostatic capacities of the capacitor C131 and the capacitor C132 are low. Therefore, during the period of the normal operation when the phase shift amount is large and the output electric power of the switching portion 140 is high, an output voltage of the diode bridge DA1 is not smoothed and the voltage Vin is almost the same value as the fully rectified waveform of the AC power source 10.

On the other hand, during the period when the switching portion 140 is stopped, the output voltage of the diode bridge DA1 is smoothed by the capacitor C131 and the capacitor C132, and the voltage Vin is clamped to the instantaneous value of the voltage of the AC power source 10. That is, even when the instantaneous value of the voltage of the AC power source 10 decreases over time, the voltage Vin does not decrease. Therefore, when the voltage Vin reaches its maximum value, it is clamped to the maximum value. During the period when the switching portion 140 is in the discharge operation, the voltage Vin gradually approaches the fully rectified waveform of the AC power source 10 as charges in the capacitor C131 and the capacitor C132 are discharged to the heating member S1, and the temperature of the heating member S1 continues to increase slightly. The phase shift amount during the period of the discharge operation is sufficiently small compared to that during the normal operation, and the output electric power during the discharge operation is also sufficiently small compared to that during the normal operation. The reason for the discharge operation will be described later. Further, the reason why the timing t13, when the operation state of the switching portion 140 shifts from the stop to the normal operation, is synchronized with the zero-cross point of the AC power source 10 immediately after the temperature of the heating member S1 becomes lower than the threshold value 1, rather than at a moment that the temperature of the heating member S1 falls below the threshold value 1, is to reduce switching noise. Details will be described later.

As described above, the temperature of the heating member S1 is maintained around the target temperature by an intermittent operation of the switching portion 140, which repeats the normal operation and the stop state. Incidentally, in the first embodiment, the control portion 110 controls the phase shift amount to be constant during the normal operation to heat the heating member S1, however, it is not necessary to keep the phase shift amount constant during the normal operation. As an example, the electric power which is supplied to the heating member S1 may be finely controlled by, for example, PID control of the phase shift amount during the normal operation, so that temperature ripple of the heating member S1 becomes small and it is possible to control the target temperature more accurately. Further, in the first embodiment, the phase shift amount during the normal operation is set to be $\pi$ rad as an example, however, the phase shift amount during the normal operation does not need to be $\pi$ rad as long as the switching portion 140 is able to perform an operation of the full bridge circuit. (Reason for Discharging and Synchronizing the Timing t13 with the Zero-Cross Point)

Incidentally, in general, in a switching power source which supplies electric power to an inductive load, remarkably large switching noise is generated due to discontinuity in an electric current which flows through the inductive load when a switching operation is started from a state while a switching is stopped. The switching noise when the switching operation is started increases as the electric current which flows through the inductive load increases. That is, the switching noise increases as the input voltage of the switching power source increases and the output electric power when the switching operation is started increases. Therefore, in a case that the switching noise when the switching operation is started is to be reduced, it is necessary to control so as to start the switching operation while the input voltage is low. However, in a case that a filter is provided between the switching portion and the diode bridge to reduce the switching noise during the normal operation, an electrostatic capacity of the filter is charged while the switching is stopped. Therefore, when the intermittent operation is performed, the switching operation is started while the input voltage of the switching portion is high when the switching operation is started, so the switching noise increases during the intermittent operation. Accordingly, in the first embodiment, when the electric power is supplied to the load in the intermittent operation, a discharge operation is performed for a certain period of time to gradually discharge the charge which is accumulated in the electrostatic capacity of the filter to the load at a small output electric power before the switching operation is started.

As described above, the control portion 110 controls the switching portion 140 so that the electric power which is output from the switching portion 140 during the discharge operation is less than the electric power which is output from the switching portion 140 during the switching operation. Specifically, in the first embodiment, the control portion 110 controls the phase shift amount during the discharge operation to be smaller than the phase shift amount during the switching operation. Furthermore, by synchronizing a timing when a large electric power is started to output to the load with the zero-cross point of the AC power source, the input voltage of the switching portion at a timing when a large electric current is started to flow to the load becomes low. Therefore, it is possible to reduce the switching noise which is generated at the timing when the large electric power is started to output to the load even during the intermittent operation. Incidentally, the phase shift amount during the discharge operation is smaller than in the normal operation so that the switching noise which generated by the discharge operation does not increase, and is a value that it is possible to discharge the electrostatic capacity of the filter by the timing of a shift to the normal operation.

As described above, according to the first embodiment, it is possible to reduce the noise when the switching is started, even in a case that the filter which has electrostatic capacity between the diode bridge and the switching portion is provided.

Second Embodiment

A switching portion of a switching power source 200 according to the second embodiment is different from that of the switching power source 100 according to the first embodiment. A circuit configuration and a control method of the switching power source 200 will be described below. Incidentally, the same reference numeral as that of the switching power source 100 according to the first embodiment will be used for a part in which the circuit configuration is similar to that of the switching power source 100 according to the first embodiment, and for simplicity, a description will be omitted.

[Switching Power Source]

First, the circuit configuration of the switching power source 200 which is a power source according to the second embodiment will be described by using FIG. 3. The switching power source 200 includes the diode bridge DA1 which fully rectifies the AC power source 10, a control portion 210, the zero-cross detection circuit 120, the filter 130, a switching portion 240 and the inductive load T1. The switching power source 200 supplies electric power to the heating member S1 on the secondary side which is a part of the inductive load T1 and isolated from the AC power source 10, and controls the switching portion 240 so that the temperature of the heating member S1 remains constant. Incidentally, similar to the switching power source 100, the switching power source 200 may be used as a switching power source which is other than the ACAC inverter.

The control portion 210 is a circuit for controlling the switching portion 240. The control portion 210 outputs a signal which controls a switching status of the switching portion 240 based on the output signal of the zero-cross detection circuit 120 and the output signal which feeds back the temperature information of the heating member S1. Unlike the control portion 110 according to the first embodiment, the control portion 210 controls the output electric power of the switching portion 240 by an on-time ratio of an FET241 (hereinafter referred to as "on-duty"). For example, the control portion 210 controls the on-duty as 60% during the normal operation. The output electric power is, for example, 1000 W. A control method of the switching portion 240 will be described in part (a), part (b), part (c) and part (d) of FIG. 4.

The switching portion 240 is an active clamp type switching circuit which is configured of two switching elements, namely, the FET241, an FET242, a capacitor C241 and a capacitor C242. A source terminal of the FET241 which is a low-side FET is connected to a low potential side of the output terminal of the diode bridge DA1. On the other hand, a drain terminal of the FET242 which is a high-side FET is connected to a high potential side of the output terminal of the diode bridge DA1 via the capacitor C242 for voltage clamp. Further, the drain terminal of the FET241 is connected to the source terminal of the FET242. The capacitor C241 is connected to the FET241 in parallel, and the capacitor C242 and the FET242 are connected in series.

In order to reduce an electric power loss which is generated in the FET241, the capacitor C241 is connected between the drain terminal and the source terminal of the FET241. The primary inductor P1 of the inductive load T1 is connected between the drain terminal of the FET241 and one end of the capacitor C242.

The FET241 and the FET242 are controlled to turn on and off complementarily with the dead times and the on duty of the FET241 is controlled according to the output electric power.

The higher the on-duty of the FET241, the higher the output electric power of the switching power source 200.

Incidentally, the FET241 and the FET242 are NchFETs, and similar to the first embodiment, switching elements other than the FETs may be used.

[Control of Switching Power Source]

A method of controlling the switching power source 200 will be described by using part (a), part (b), part (c) and part (d) of FIG. 4.

Part (a) of FIG. 4 shows the voltage Vin while the switching power source 200 is operating. Part (b) of FIG. 4 shows operating states of the switching portion 240 (normal operation, stop, discharge). Part (c) of FIG. 4 shows the on-duty (%) of the FET241. Part (d) of FIG. 4 shows the temperature of the heating member S1. In all of them, horizontal axes indicate time. Each of t10, t11, t12 and t13 in the horizontal axes indicates timing.

The control portion 210 controls an operating state of the switching portion 240 and the on-duty of the FET241 so that the temperature of the heating member S1 remains around the target temperature. The voltage Vin which is an input voltage of the switching portion 240 and the temperature of the heating member S1 vary depending on the operating state of the switching portion 240. When the temperature of the heating member S1 becomes lower than the threshold value 1, the control portion 210 operates the switching portion 240 in discharge operation (timing t22) and then in the normal operation (timing t23), and when the temperature of the heating member S1 becomes higher than the threshold value 2, the control portion 210 stops the switching portion 240 (timing t21).

During periods when the switching portion 240 is in the normal operation (from t20 to t21, from t23), the temperature of the heating member S1 continues to increase, and during a period when the switching portion 240 is stopped (from t21 to t22), the temperature of the heating member S1 continues to decrease. In a graph of the voltage Vin, a dashed line shows the voltage waveform in which the AC power source 10 is fully rectified, and a solid line shows the voltage Vin which is the input voltage of the switching portion 240. As described in the first embodiment, during the period of the normal operation when the output electric power of the switching portion 240 is high, the output voltage of the diode bridge DA1 is not smoothed and the voltage Vin is almost the same value as the fully rectified waveform of the AC power source 10.

On the other hand, during the period when the switching portion 240 is stopped, the output voltage of the diode bridge DA1 is smoothed by the capacitor C131 and the capacitor C132, and the voltage Vin is clamped to the instantaneous value of the voltage of the AC power source 10. During the period (from t22 to t23) when the switching portion 240 is in the discharge operation in a shift from the stop state to the normal operation, the charges in the capacitor C131 and the capacitor C132 are discharged to the heating member S1. By doing this, the voltage Vin gradually approaches the fully rectified waveform of the AC power source 10, and the temperature of the heating member S1 continues to increase slightly. The on-duty during the period of the discharge operation is sufficiently small compared to that during the normal operation, and the output electric power during the discharge operation is also sufficiently small compared to that during the normal operation. Similar to the first embodiment, the reason why the discharge operation is performed is to reduce switching noise. Incidentally, in the second embodiment, the on-duty during the normal operation is set to be 60% as an example, however, it does not need to be 60%, as long as the switching portion 240 is able to perform an operation of the active clamp circuit.

As described above, the control portion 210 controls the switching portion 240 so that the electric power which is output from the switching portion 240 during the discharge operation is less than the electric power which is output from the switching portion 240 during the switching operation. The control portion 210 controls the on-duty during the discharge operation to be smaller than the on-duty during the switching operation. Furthermore, a timing when a large electric power is started to output to the load is synchronized with the zero-cross point of the AC power source.

By the way, the reason why the active clamping type circuit is applied in the switching power source 200 according to the second embodiment, unlike the switching power source 100 according to the first embodiment, is to decrease size and cost of the switching power source. In general, an electric power which generated in a switching element of a switching power source tends to increase with an output electric power. Therefore, it is necessary to take a measure to prevent overheating of the switching element for switching power sources such as the switching power source 200 and the switching power source 100 according to the first embodiment 1, in which the output electric power is 1000 W or more.

As a measure to suppress overheating of a switching element, there are several methods such as providing a heat sink and applying a switching element with low on-resistance, however many of those measures lead to increase size and cost of a switching power source. Although there are differences in electric powers which are generated in switching elements depending on circuit systems, it is possible to reduce the size and the cost of the circuit when the number of the switching elements which are used is smaller, since it is necessary to apply the measure which is described above to all of the switching elements.

Further, a cost reduction of the control portion is also expected by reducing the number of the switching portions which are used. In a switching power source which performs complex control such as the switching power source 100 according to the first embodiment and the switching power source 200, a control element such as a general purpose microcomputer may be used in the control portion. Since general purpose microcomputers tend to increase in price with the number of pins and peripheral functions, the fewer switching elements to be controlled, the less expensive microcomputer can be used. Further, in a circuit system which includes a high-side switching element such as a full bridge circuit and an active clamp circuit, a circuit which drives the high-side switching element is required. Therefore, when the number of the switching elements which are used is smaller, a cost of the driving circuit leads to be reduced. Thus, the switching power source 200 is possible to configure a control portion at a lower cost than the switching power source 100 according to the first embodiment.

As described above, according to the second embodiment, it is possible to reduce the noise when the switching is started, even in a case that the filter which has electrostatic capacity between the diode bridge and the switching portion is provided.

Third Embodiment

A switching portion of a switching power source 300 according to the third embodiment is different from that of the switching power source 100 according to the first embodiment and that of the switching power source 200 according to the second embodiment. A circuit configuration and a control method of the switching power source 300 will be described below. Incidentally, the same reference numeral as that of the switching power source 100 according to the first embodiment and that of the switching power source 200 according to the second embodiment will be used for a part in which the circuit configuration is similar to that of the switching power source 100 according to the first embodiment and that of the switching power source 200 according to the second embodiment, and for simplicity, a description will be omitted.

[Switching Power Source]

The circuit configuration of the switching power source 300 which is a power source according to the third embodiment will be described by using FIG. 5. The switching power source 300 includes the diode bridge DA1 which fully rectifies the AC power source 10, a control portion 310, the zero-cross detection circuit 120, the filter 130, a switching portion 340 and the inductive load T1. The switching power source 300 supplies electric power to the heating member S1 on the secondary side which is isolated from the AC power source 10 by the inductive load T1, and controls the switching portion 340 so that the temperature of the heating member S1 remains constant. Incidentally, similar to the switching power source 100, the switching power source 300 may be used as a switching power source which is other than the ACAC inverter.

The control portion 310 is a circuit for controlling the switching portion 340. The control portion 310 outputs a signal which controls a switching status of the switching portion 340 based on the output signal of the zero-cross detection circuit 120 and the output signal which feeds back the temperature information of the heating member S1. Unlike the control portion 110 according to the first embodiment and the control portion 210 according to the second embodiment, the control portion 310 controls an output electric power of the switching portion 340 by switching frequencies of the FET341 and the FET342. For example, the control portion 310 controls the switching frequency as 50 kHz during the normal operation. A control method of the switching portion 340 will be described in part (a), part (b), part (c) and part (d) of FIG. 6.

The switching portion 340 is a current resonance type switching circuit which is configured of two of the switching elements, namely, the FET341 and the FET 342, and a capacitor C341. A source terminal of the FET341 which is a low-side FET is connected to a low potential side of the output terminal of the diode bridge DA1. On the other hand, a drain terminal of the FET342 which is a high-side FET is connected to a high potential side of output terminals of the diode bridge DA1. Further, the drain terminal of the FET341 is connected to the source terminal of the FET342. The primary inductor P1 of the inductive load T1 and the capacitor C341 are connected in series, and the inductor P1 and the capacitor C341 are connected between the drain terminal and the source terminal of the FET341. The FET341 and the FET342 are controlled to turn on and off complementarily with the dead times and the switching frequency is controlled according to the output electric power. The lower (smaller) the switching frequencies of the FET341 and the FET342, the higher the output electric power of the switching power source 300. Incidentally, the FET341 and the FET342 are NchFETs, and similar to the first embodiment, switching elements other than the FETs may be used.

[Control of Switching Power Source]

A method of controlling the switching power source 300 will be described by using part (a), part (b), part (c) and part (d) of FIG. 6. Part (a) of FIG. 6 shows the voltage Vin while the switching power source 300 is operating. Part (b) of FIG. 6 shows operating states of the switching portion 340 (normal operation, stop, discharge). Part (c) of FIG. 6 shows the switching frequencies (Hz) of the FET341 and the FET342. Part (d) of FIG. 6 shows the temperature of the heating member S1. In all of them, horizontal axes indicate time. Each of t10, t11, t12 and t13 in the horizontal axes indicates timing.

The control portion 310 controls an operating state of the switching portion 340 and the switching frequency so that the temperature of the heating member S1 remains around the target temperature. By doing this, the voltage Vin which is an input voltage of the switching portion 340 and the temperature of the heating member S1 vary depending on the operating state of the switching portion 340. When the temperature of the heating member S1 becomes lower than the threshold value 1, the control portion 310 operates the switching portion 340 in discharge operation (timing t32) and then in the normal operation (timing t33), and when the temperature of the heating member S1 becomes higher than the threshold value 2, the control portion 310 stops the switching portion 340 (timing t31). During periods when the switching portion 340 is in the normal operation (from t30 to t31, from t33), the temperature of the heating member S1 continues to increase, and during a period when the switching portion 340 is stopped (from t31 to t32), the temperature of the heating member S1 continues to decrease.

In a graph of the voltage Vin, a dashed line shows the voltage waveform in which the AC power source 10 is fully rectified, and a solid line shows the voltage Vin which is the input voltage of the switching portion 340. As described in the first embodiment, during the period of the normal operation when the output power of the switching portion 340 is high, the output voltage of the diode bridge DA1 is not smoothed and the voltage Vin is almost the same value as the fully rectified waveform of the AC power source 10. On the other hand, during the period when the switching portion 340 is stopped, the output voltage of the diode bridge DA1 is smoothed by the capacitor C131 and the capacitor C132, and the voltage Vin is clamped to the instantaneous value of the voltage of the AC power source 10.

During the period when the switching portion 340 is in the discharge operation in the shift from the stop state to the normal operation, the charges in the capacitor C131 and the capacitor C132 are discharged to the heating member S1. By doing this, the voltage Vin gradually approaches the fully rectified waveform of the AC power source 10, and the temperature of the heating member S1 continues to increase slightly. The switching frequency during the period of the discharge operation is sufficiently small compared to that during the normal operation, and the output power during the discharge operation is also sufficiently small compared to that during the normal operation. For example, the control portion 310 controls the switching frequency as 90 kHz (>50 kHz) during the discharge operation, in contrast with the switching frequency of 50 kHz during the normal operation.

As described above, the control portion 310 controls the switching portion 340 so that the electric power which is output from the switching portion 340 during the discharge operation is less than the electric power which is output from the switching portion 340 during the switching operation. The control portion 310 controls so that the switching frequency during the discharge operation is larger than the switching frequency during switching operation. Furthermore, a timing when a large electric power is started to output to the load is synchronized with the zero-cross point of the AC power source.

Similar to the first embodiment, the reason why the discharge operation is performed is to reduce switching noise. Incidentally, in the third embodiment, as an example, the switching frequency during the normal operation is set at 50 kHz and the switching frequency during the discharge operation is set at 90 kHz, however, an optimal value may be set according to a circuit configuration as long as the switching frequency is such that the output power of the discharge operation is smaller than that of the normal operation.

By the way, the switching portion 340 is configured of two of the switching elements in the third embodiment, however, unlike in the second embodiment in which the switching portion 240 is also configured of two of the switching elements, the circuit of the current resonance type is applied. The reason is to reduce a cost of a core of the primary inductor P1 of the inductive load T1.

In the switching circuit in which an output electric power is large such as in the second embodiment, a peak value of the electric current which flows into the primary inductor P1 of the inductive load T1 is extremely large. Therefore, magnetic flux density in the core of the primary inductor P1 also becomes large, and there are concerns that magnetic saturation of the core may occur. When the core reaches magnetic saturation, a coupling coefficient between the primary inductor P1 and the heating member S1, and an inductance of the primary inductor P1 are decreased significantly, so that it becomes unable to supply electric power to the heating member S1. In addition, problems such as a circuit breakdown which is caused by flowing large electric current into the switching circuit may occur. Therefore, it is necessary to use the core which has high saturation magnetic flux density in order to avoid magnetic saturation in the switching circuit which outputs large electric power. However, in general, saturation magnetic flux density of magnetic material which is used for core is determined by material, and when properties other than saturation magnetic flux density are equal, the higher the saturation magnetic flux density, the more expensive.

Therefore, in a case that the same electric power is to be output to the heating member S1, when the peak value of the electric current which flows into the primary inductor P1 is reduced, it is possible to use material, whose saturation magnetic flux density is small, for the core, and it leads to reduce the cost. In a current resonance type switching power source, the peak value of the electric current which flows into the primary inductor P1 is smaller than that of an active clamp type switching power source since resonance is caused by a capacitor which is connected in series with the primary inductor P1. Thus, in the switching power source 300 according to the third embodiment, in a case that the output power is the same, it is possible to select inexpensive material for the core which is used for the primary inductor P1, compared to the switching power source 200 according to the second embodiment.

As described above, according to the third embodiment, it is possible to reduce the noise when the switching is started, even in a case that the filter which has electrostatic capacity between the diode bridge and the switching portion is provided.

Forth Embodiment

[Description of Laser Beam Printer]

FIG. 7 shows a schematic configuration of a laser beam printer as an example of an image forming apparatus. A laser beam printer 1000 (hereinafter referred to as "printer 1000") includes a photosensitive drum 1010, a charging portion 1020 and a developing portion 1030. The photosensitive drum 1010 is an image bearing member on which an electrostatic latent image is formed. The charging portion 1020 uniformly charges the photosensitive drum 1010. An optical scanning device 1025, which is an exposure portion, forms an electrostatic latent image by scanning a laser light on the photosensitive drum 1010 according to image data. The developing portion 1030 forms a toner image by developing the electrostatic latent image which is formed on the photosensitive drum 1010 with toner. The toner image which is formed on the photosensitive drum 1010 (on the image bearing member) is transferred by a transfer portion 1050 to a sheet P as a recording material which is supplied from a cassette 1040. The unfixed toner image which is transferred onto the sheet P is fixed by a fixing device 1060 which is a fixing portion, and discharged to a tray 1070. The photosensitive drum 1010, the charging portion 1020, the developing portion 1030, and the transfer portion 1050 are an image forming portion (image forming portion). Further, a printer 1000 is provided with a power source device 1080, and supplies electric power from the power source device 1080 to a driving portion such as a motor and a control portion 5000. Further, electric power is supplied from the power source device 1080 to a heating member (not shown in FIG. 7) in which the fixing device 1060 includes. It is possible to use the switching power source 100 according to the first embodiment, the switching power source 200 according to the second embodiment and the switching power source 300 according to the third embodiment as the power source device 1080. That is, in a case of a configuration in which the electric power is supplied to the fixing device 1060 from the switching power source 100, the switching power source 200 or the switching power source 300, the heating member S1 which is described in FIG. 1, etc. corresponds to the heating member of the fixing device 1060.

The control portion 5000 includes a CPU (not shown) and controls an image forming operation by the image forming portion, a feeding operation of the sheet P, the temperature of the fixing device 1060, etc. The control portion 5000 may control the control portion 110 according to the first embodiment, the control portion 210 according to the second embodiment or the control portion 310 according to the third embodiment. The printer 1000 transitions to a standby state such that it is possible to execute a print operation immediately after a lapse of a predetermined period, when it completes a print operation. After a lapse of another predetermined period of time, the printer 1000 transitions from the standby state to a sleep state which is a low electric power consumption mode, in order to reduce the electric power consumption during standby. The printer 1000 has three states: the sleep state and the standby state which are a second mode, and a print state which is a first mode, and the control portion 5000 transitions to each state. Incidentally, the image forming apparatus, in which it is possible to apply the switching power source 100 according to the first embodiment, the switching power source 200 according to the second embodiment and the switching power source 300 according to the third embodiment, is not limited to a configuration which is illustrated in FIG. 7.

As described above, according to the fourth embodiment, it is possible to reduce the noise when the switching is started, even in a case that the filter which has electrostatic capacity between the diode bridge and the switching portion is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-187723 filed Nov. 24, 2022, which is hereby incorporated by reference herein in its entirety.

What is claimed is:

1. A power source device comprising:
a rectifying portion configured to fully rectify an AC voltage;
a switching portion including a switching element and configured to apply a voltage to a load, fully rectified by the rectifying portion, by a switching operation of the switching element;
a detecting portion configured to detect a zero-cross point of the AC voltage;
a control portion configured to control the switching operation of the switching portion; and
a filter portion including a capacitor, provided between the rectifying portion and the switching portion and configured to absorb a switching noise generated in the switching portion,
wherein the control portion configured to control the switching portion so as to execute a discharge operation to discharge the capacitor before starting the switching operation from a stop state of the switching operation and so as to start the switching operation when the zero-cross point is detected by the detecting portion, and
wherein an electric power outputted from the switching portion during the discharge operation is smaller than an electric power outputted from the switching portion during the switching operation.

2. A power source device according to claim 1, wherein the switching portion including four of the switching elements and is a full bridge type switching circuit controlled by a phase shift amount, the switching circuit outputting the electric power larger, the lager the phase shift amount is, and
wherein the control portion controls such that the phase shift amount during the discharging operation is smaller than the phase shift amount during the switching operation.

3. A power source device according to claim 1, wherein the switching portion including two of the switching elements and is an active clamp type switching circuit controlled by an on-duty, the switching circuit outputting the electric power larger, the lager the on-duty is, and
wherein the control portion controls such that the on-duty during the discharging operation is smaller than the on-duty during the switching operation.

4. A power source device according to claim 1, wherein the switching portion including two of the switching elements and is a current resonance type switching circuit controlled by a switching frequency, the switching circuit outputting the electric power larger, the smaller the switching frequency is, and
wherein the control portion controls such that the switching frequency during the discharging operation is larger than the switching frequency during the switching operation.

5. A power source device according to claim 1, wherein the load includes a inductor on a primary side connected to the switching portion and a heating member on a secondary side insulated from the inductor,
wherein the power source device is provided with a temperature detecting portion configured to detect a temperature of the heating member, and
wherein the control portion controls an operation of the switching portion based on the temperature detected by the detecting portion.

6. A power source device according to claim 5, wherein the control portion controls the switching portion so as to start the discharge operation when the detected temperature is lower than a first threshold temperature and so as to stop the switching operation when the detected temperature is higher than a second threshold temperature higher than the first threshold temperature.

7. An image forming apparatus comprising:
an image forming portion configured to form a toner image on a recording material;
a fixing portion including a heating member and configured to fix the toner image formed by the image forming portion; and
a power source portion including:
a rectifying portion configured to fully rectify an AC voltage,
a switching portion including a switching element and configured to apply a voltage fully rectified by the rectifying portion, by a switching operation of the switching element to the heating member,
a detecting portion configured to detect a zero-cross point of the AC voltage,
a control portion configured to control the switching operation of the switching portion, and
a filter portion including a capacitor, provided between the rectifying portion and the switching portion and configured to absorb a switching noise generated in the switching portion,
wherein the control portion is configured to control the switching portion so as to execute a discharge operation to discharge the capacitor before starting the switching operation from a stop state of the switching operation and so as to start the switching operation when the zero-cross point is detected by the detecting portion, and wherein an electric power output from the switching portion during the discharge operation is smaller than an electric power output from the switching portion during the switching operation.

8. An image forming apparatus according to claim 7, wherein the switching portion including four of the switching elements and is a full bridge type switching circuit controlled by a phase shift amount, the switching circuit outputting the electric power larger, the lager the phase shift amount is, and wherein the control portion controls such that the phase shift amount during the discharging operation is smaller than the phase shift amount during the switching operation.

9. An image forming apparatus according to claim 7, wherein the switching portion including two of the switching elements and is an active clamp type switching circuit controlled by an on-duty, the switching circuit outputting the electric power larger, the larger the on-duty is, and wherein the control portion controls such that the on-duty during the discharging operation is smaller than the on-duty during the switching operation.

10. An image forming apparatus according to claim 7, wherein the switching portion including two of the switching elements and is a current resonance type switching circuit controlled by a switching frequency, the switching circuit outputting the electric power larger, the smaller the switching frequency is, and wherein the control portion controls such that the switching frequency during the discharging operation is larger than the switching frequency during the switching operation.

11. An image forming apparatus according to claim 7, further comprising a temperature detecting portion configured to detect a temperature of the heating member, and wherein the control portion controls an operation of the switching portion based on the temperature detected by the detecting portion.

12. An image forming apparatus according to claim 11, wherein the control portion controls the switching portion so as to start the discharge operation when the detected temperature is lower than a first threshold temperature and so as to stop the switching operation when the detected temperature is higher than a second threshold temperature higher than the first threshold temperature.

13. An image forming apparatus comprising:
an image forming portion configured to form a toner image on a recording material;
a fixing portion configured to fix the toner image formed by the image forming portion to the recording material, the fixing portion includes a heating member, for heating the toner image, on a secondary side which is a part of an inductive load; and
a power source portion configured to supply an electric power to the inductive load, the power source portion including:
a rectifying portion configured to fully rectify an AC voltage,
a switching portion including a switching element and configured to apply a voltage fully rectified by the rectifying portion, by a switching operation of the switching element, to the inductive load,
a control portion configured to control the switching operation of the switching portion, and
a filter portion including a capacitor, provided between the rectifying portion and the switching portion and configured to absorb a switching noise generated in the switching portion, wherein the control portion configured to control the switching portion so as to execute a discharge operation to discharge the capacitor before starting the switching operation from a stop state of the switching operation and so as to start the switching operation after an output voltage Vin of the filter drops from a maximum voltage of the AC voltage, and wherein an electric power outputted from the switching portion during the discharge operation is smaller than an electric power outputted from the switching portion during the switching operation.

14. An image forming apparatus according to claim 13, wherein the switching portion including four of the switching elements and is a full bridge type switching circuit controlled by a phase shift amount, the switching circuit outputting the electric power larger, the lager the phase shift amount is, and wherein the control portion controls such that the phase shift amount during the discharging operation is smaller than the phase shift amount during the switching operation.

15. An image forming apparatus according to claim 13, wherein the switching portion including two of the switching elements and is an active clamp type switching circuit controlled by an on-duty, the switching circuit outputting the electric power larger, the larger the on-duty is, and wherein the control portion controls such that the on-duty during the discharging operation is smaller than the on-duty during the switching operation.

16. An image forming apparatus according to claim 13, wherein the switching portion including two of the switching elements and is a current resonance type switching circuit controlled by a switching frequency, the switching circuit outputting the electric power larger, the smaller the switching frequency is, and wherein the control portion controls such that the switching frequency during the discharging operation is larger than the switching frequency during the switching operation.

17. An image forming apparatus according to claim 13, further comprising a temperature detecting portion configured to detect a temperature of the heating member, and wherein the control portion controls the switching operation of the switching portion so that the temperature detected by the detecting portion is maintained at a target temperature.

18. An image forming apparatus according to claim 17, wherein the control portion controls the switching portion so as to start the discharge operation when the detected temperature is lower than a first threshold temperature and so as to stop the switching operation when the detected temperature is higher than a second threshold temperature higher than the first threshold temperature, and wherein the target temperature is set between the first threshold temperature and the second threshold temperature.

19. An image forming apparatus according to claim 13, wherein a film capacitor is applied to the capacitor of the filter portion.

* * * * *